United States Patent [19]

Takagi

[11] 3,812,874

[45] May 28, 1974

[54] DIFFERENTIAL PRESSURE SENSING VALVE

[75] Inventor: Makoto Takagi, Kobe, Japan

[73] Assignee: The Nippon Air Brake Co., Ltd., Kobe, Japan

[22] Filed: Nov. 17, 1972

[21] Appl. No.: 307,574

[30] Foreign Application Priority Data
Nov. 25, 1971 Japan............................46-110409

[52] U.S. Cl............................... 137/110, 137/627.5
[51] Int. Cl. ........................................... G05d 16/06
[58] Field of Search ........... 137/110, 599, 627.5, 85

[56] References Cited
UNITED STATES PATENTS
| | | | |
|---|---|---|---|
| 3,115,147 | 12/1963 | Mueller............................. | 137/85 X |
| 3,547,498 | 12/1970 | Bueler.............................. | 137/110 X |
| 3,575,343 | 4/1971 | Kreuter............................ | 137/110 X |

Primary Examiner—Robert G. Nilson
Attorney, Agent, or Firm—R. W. McIntire, Jr.

[57] ABSTRACT

A control valve device especially adapted for the control of a marine engine so as to bypass a critical region of its speed range in which a resonant frequency vibration is encountered. The control valve comprises a differential piston abutment the stem of which cooperates with valve means to control the fluid pressure communication between either a first or second inlet and an outlet which controls the throttle of said engine. Detent means provides a latching force in either of two extreme positions to prevent actuation of the piston abutment in response to a variable speed control signal until the speed control signal reaches a value sufficient to overcome the latching force of the detent means, which latching force corresponds to the upper limit of the critical speed range. In one extreme position of the piston abutment, the valve means is effective to pressurize the outlet in accordance with the output of a regulating valve adjusted to limit the speed control signal to a value corresponding to the lower limit of the critical speed range, while in the other extreme position, the valve means is effective to pressurize the outlet in accordance with the speed control signal. The detent means may be employed either alone or in conjunction with a second regulating valve, the output of which biases the piston abutment in opposition to the speed control signal, to establish the upper limit of the critical speed range.

9 Claims, 4 Drawing Figures

PATENTED MAY 28 1974 3,812,874

DIFFERENTIAL PRESSURE SENSING VALVE

BACKGROUND OF THE INVENTION

A wide application of digital on/off type valve devices is found in industry today. These digital valve devices operate to establish an output condition which varies between two extreme values, as opposed to analog type valve devices where the output varies infinitely with changes in the control signal. Difficulty has been encountered, however, in applications where these digital valve devices are subject to a gradually changing control signal, especially where the valve sensitivity is required to switch the output condition rapidly and positively in response to a precise control signal. Remote control systems for marine engines is an example of such an application where the use of a digital valve device would be desirable. It is well known that a severe vibration condition arises in a critical resonant frequency region of the speed range of these marine engines. It is common practice, therefore, to provide automatic means to bypass this resonant frequency region in order to avoid possible component damage and discomfort to the occupants of the vessel. In conventional digital type valve devices, the necessary sensitivity and accuracy in switching the output condition of the valve is not sufficient to permit utilization in such a control system so that rather complex and expensive electrical mechanisms are presently employed.

SUMMARY OF THE INVENTION

It is accordingly the object of the present invention to provide a simple, low-cost, digital type valve device capable of effecting rapid and positive switching of the output condition in response to a precise control signal, even when the control signal changes gradually.

It is another object of the invention to provide a valve device of the above type having detent means for preventing actuation of the valve device and accordingly preventing switching of the valve output condition except in response to a control signal in excess of the detent force.

It is a further object of the invention to provide adjustable detent means to permit selective control of the signal at which it is desired to switch the valve output condition.

In carrying out the objects of the invention, there is provided a digital type control valve device having valve means capable of simply providing for the supply and interruption of supply fluid pressure at the valve output port or supply of fluid pressure to the output port from either one of two separate sources in accordance with the different output conditions of the valve device. The valve means is operated in accordance with engagement by the stem of a differential piston. Formed along the stem of the piston are recesses, each adapted to receive a different one of a pair of spring-loaded latch rollers to provide a detent for locking the piston in either one or the other of its extreme positions until a predetermined pressure differential is created across the piston sufficient to overcome the latching force and actuate the piston from one to the other of its extreme positions. The detent spring load is adjustable to permit selection of the differential force required to actuate the valve, thereby providing for accurate and rapid operation of the valve means to positively switch the output condition of the valve device at a precise point, irrespective of gradual changes in the control signal.

Other objects, features and attendant advantages of the invention will appear in the following more detailed description when considered in view of the accompanying drawings of which:

DESCRIPTION AND OPERATION

Figure 1:
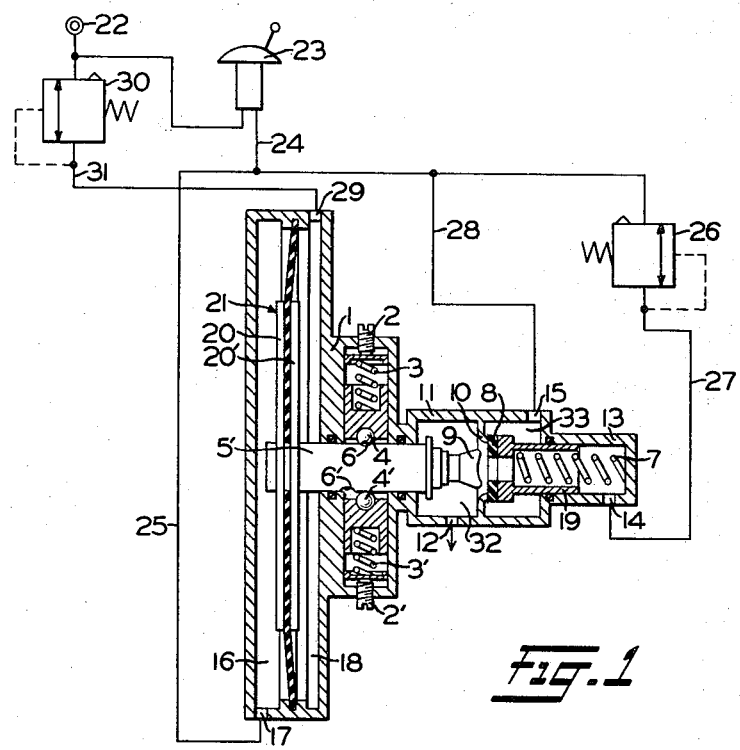
FIG. 1 is a diagrammatic section view showing one extreme position of the valve device of the invention as employed in a control system for remotely controlling a marine engine.

A preferred embodiment of the invention is shown in FIG. 1 wherein a valve device 1 is shown of the type capable of sensing variable differential pressures. A piston rod 5 extending from a differential piston abutment 21 is sealingly supported for axial movement in the valve body. Valve device 1 consists of a pair of latch rollers 4 and 4' which bear against rod 5 under the influence of springs 3 and 3'. The springs are arranged with adjusting screws 2 and 2' to control the spring pressure exerted on latch rollers 4 and 4', which are carried in retainer members housed in oppositely disposed chambers of the valve body so as to lie in a plane perpendicular to the axis of rod 5. Formed along the surface of rod 5 transverse of the rod axis for receiving the latch rollers 4 and 4' are a pair of recesses or grooves 6 and 6' conforming in shape substantially to latch rollers 4 and 4'. Grooves 6 and 6' are displaced axially along the axial direction of rod 5 so that piston abutment 21 is latched in one or the other of its extreme positions by the latching detent arrangement. With latch rollers 4 and 4' engaged with groove 6 or 6', respectively, piston abutment 21 is positively maintained in a corresponding one of its extreme positions under the influence of the detent spring load until a predetermined axial force is exerted on rod 5 by piston abutment 21 sufficient to force the engaged latch roller out of its groove and onto the surface of rod 5.

Piston abutment 21 comprises a diaphragm clamped at its outer periphery to the valve body and secured to rod 5 by means of clamping plates 20 and 20', thereby forming in cooperation with the valve body a head end pressure chamber 16 and a rod end pressure chamber 18. Chamber 16 is provided with a port 17 to which fluid pressure is connected from a fluid pressure controller 23 via conduits 24 and 25. Controller 23 is supplied with fluid pressure from a source 22, which also supplies fluid pressure to a pressure regulating valve device 30. The output of valve device 30 is connected via conduit 31 to a port 29 of chamber 18 so as to establish therein a predetermined pressure corresponding to the preselected output of valve 20.

Figure 2:
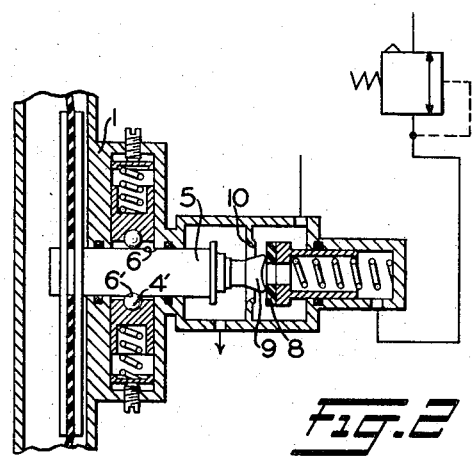
FIG. 2 is a partial diagrammatic section view similar to FIG. 1, but showing the valve device in its other extreme position.

Piston rod 5 is formed at the end opposite piston abutment 21 with a valve seat 9. An annular fixed valve seat 10 is formed on the inner surface of a cylindrical portion 11 of valve device 1. Valve seat 10 is coaxial with valve seat 9 and normally supports under the influence of a spring 7 a valve disc 8 that is carried by a movable valve member 19. A reduced end section 13 of cylindrical portion 11 sealingly houses movable valve member 19. Valve seat 10 separates cylindrical portion 11 into a chamber 32 on the rod side and a chamber 33 on the other side. In the position of piston abutment 21 shown in FIG. 1, valve seat 9 is removed from valve disc 8 to communicate chamber 32 with the spring chamber housing valve member 19 via an opening in valve disc 8 and member 19. In the position of piston abutment 21 shown in FIG. 2, the above-mentioned communication is closed and chamber 32 is communicated instead with chamber 33 by reason of seat 9 engaging valve disc 8 and lifting valve disc 8 off of seat 10.

The output of valve device 1 is provided at a port 12 in chamber 32. There is also provided a supply port 15 in chamber 33 and an alternate supply port 14 in the spring chamber. Output port 12 may be connected to a power actuator, for example. Supply port 15 is connected to controller 23 via conduit 24 and branch conduit 28, while supply port 14 is connected by a conduit 27 to the output of a pressure regulating valve device 28, which is adjusted to limit the pressure effective at conduit 27, to a value less than the predetermined value to which regulating valve 30 limits fluid pressure at conduit 31.

Figure 3:
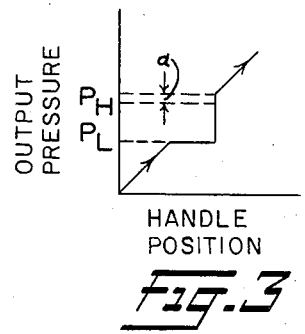
FIGS. 3 and 4 show a pair of curves which illustrate the pressure versus time relationships in effecting the precise switching of the valve output conditions.

The graphs in FIG. 3 show a curve representing the effective output pressure at port 12 when valve device 1 is employed in a remote marine engine control system for the purpose of bypassing a critical resonant frequency region of the marine engine. This particular critical speed region is designated as the range lying between point $P_L$ which corresponds to the maximum output pressure of regulating valve 26, and point $P_H$ which corresponds to the maximum output pressure of regulating valve 30.

In operation it is to be understood that increasing and decreasing engine speeds are realized by effecting a relatively slow, continuous change in the power demand so as to not damage the engine. As shown in FIG. 1, this may be accomplished by effecting a steady movement of the handle associated with controller 23 to the speed position desired. Assuming this desired speed position requires an increase in the engine speed sufficient to pass through its critical resonant frequency speed region, it is to be understood that valve device 1 operates to suppress any further buildup of fluid pressure at port 12 when the controller handle reaches a position corresponding to pressure $P_L$ of FIG. 3 and resumes output pressure buildup only when the handle reaches a position corresponding to pressure $P_H + a$, the latter factor representing the force required to overcome the spring load on latch roller 4 or 4'.

In assuming, for example, that the handle of controller 23 is moved from zero speed position to increasingly higher speed positions, controller 23 operates to adjust the fluid pressure supplied via source 22 to provide a corresponding pressure in conduit 24 from where it is connected to supply port 15, to supply port 14 via regulating valve 26 and to chamber 16, where it acts on the face of piston abutment 21 in opposition to fluid pressure supplied to chamber 18 via conduit 31 and regulating valve 30 corresponding to the upper critical pressure $P_H$ of the resonant frequency speed region. Due to the higher initial pressure effective in chamber 18, of course, piston abutment 21 is positioned, as shown in FIG. 1, with latch roller 4 engaged with groove 6. In this extreme leftward position of piston abutment 21, valve seat 9 is withdrawn from disc valve 8, which is accordingly spring biased into engagement with seat 10. Accordingly, fluid pressure at port 14 is communicated by way of the central opening in valve member 19 to output 12, while supply pressure effective at port 15 is bottled up in chamber 33.

Now when the output pressure of controller 23 reaches the critical pressure corresponding to the lower limit $P_L$ of the critical resonant frequency speed region, regulating valve 26 will operate to prevent any further increase in pressure at supply port 14 so that output pressure at port 12 is maintained constant at a value corresponding to the lower limit of the critical speed region, even though the output of controller 23 continues to increase as the handle is advanced through the critical speed region.

When the output pressure of controller 23 subsequently exceeds a value corresponding to the upper limit $P_H$ of the critical resonant frequency speed region, a pressure differential will begin to occur urging piston abutment 21 in the direction of the right hand. When this pressure differential reaches a value $\alpha$, latch roller 4 is forced out of its groove 6 to permit positive rightward movement of piston abutment 21 to assume the position shown in FIG. 2.

In this extreme righthand position, latch roller 4 is engaged in groove 6' and valve seat 9 at the end of rod 5 engages and lifts valve disc 8 off of seat 10. This results in the constant supply pressure $P_L$ at port 14 being cut-off from output 12, which is in turn communicated with the heretofore bottled-up supply pressure effective at port 15 and chamber 33. Since this supply pressue at port 15 reflects the changing output pressure of controller 23, the output pressure at port 12 will again develop in accordance with movement of the controller handle to the desired speed position without the engine having encountered its critical resonant frequency speed region between points $P_L$ and $P_H + \alpha$ of FIG. 3.

Figure 4:
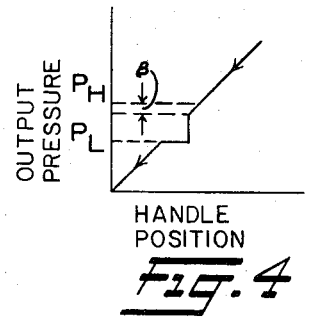

If it is now desired to reduce engine speed so as to again pass through the critical resonant frequency speed region, the handle of controller 23 is gradually returned toward its zero speed position, effecting a corresponding gradual reduction in output pressure effective in chamber 16. When this reducing pressure establishes a pressure differential $\beta$ urging piston abutment 21 in the left-hand direction, rod 5 will exert sufficient axial force to cause latch roller 4' to be disengaged from groove 6', thereby creating a positive force differential to move piston abutment 21 back to its extreme right-hand position. Accordingly, the initial output condition is reestablished wherein supply pressure at port 14 corresponding to point $P_L$ of FIG. 4 is communicated with port 12. This pressure is maintained for a brief period while the controller handle is moved back through the critical speed region. When the controller handle corresponds to point $P_L$ of FIG. 3, as determined by the maximum output pressure of regulating valve 26, the critical speed region will have been bypassed and continued handle movement of controller 23 toward zero speed will result in a corresponding reduction of supply pressure at port 14 and accordingly a reduction of output pressure at port 12.

In the embodiment shown and above described, valve device 1 operates in conjunction with high limit pressure regulating valve device 30 and low limit pressure regulating valve device 26 to switch output pressure between a pair of supply ports having different pressures in order to bypass a critical speed region of the marine engine. The embodiment further includes detent means which are adjustable for providing a positive actuation of piston abutment 21 between its extreme right and left-hand positions corresponding to the different output conditions of port 12. It is important to note, however, that valve device 1 can be utilized in different applications where only the supply and interruption of output pressure is required in response to predetermined differential control pressures. Consequently, only one or the other of supply ports 14 or 15 need be connected to a source of supply and regulating valves 26 and 30 are omitted. Actuation of piston abutment 21 will occur when the effective control pressure differential thereat is sufficient to overcome the detent force provided by latch rollers 4 or 4' to accordingly effect a rapid switching of the output condition at a precise value of differential control pressure as provided by adjusting screws 2 and 2'.

Having now described the invention, what I claim as new and desire to secure by Letters Patent, is:

1. Apparatus for automatically controlling the throttle of an engine so as to bypass a critical speed region encountered at the resonant frequency of said engine wherein said engine otherwise experiences high vibration forces, said critical speed region being defined by predetermined first and second speed thresholds within the normal speed range of said engine, said apparatus comprising:
    a operator's control means having a manually operable handle positionable in a speed zone of said control means corresponding to the normal speed range of said engine for providing a speed signal corresponding to the selected position of said handle;
    b. a control valve device having first and second inlets and an outlet for providing a throttle control signal, said control valve device comprising:
        i. a piston abutment operable in response to said speed signal;
        ii. valve means operative responsive to movement of said piston abutment for establishing fluid pressure communication between said first inlet and said outlet in a first position of said piston abutment and for establishing fluid pressure communication between said second inlet and said outlet in a second position of said piston abutment; and
        iii. detent means for providing a latching force to hold said piston abutment in one of said first and second positions until said speed signal overcomes said latching force to shift said piston abutment to the other one of said first and second positions thereof; and
    c. first pressure regulating means interposed between said operator's control means and said control valve device, said regulating means being operable to limit said speed control signal to a value corresponding to said first predetermined speed threshold for delivery to said first inlet, said second inlet being subject to said speed control signal, whereby said engine is operated at said first predetermined speed threshold when the handle of said controller is in said critical speed region.

2. Apparatus, as recited in claim 1, wherein said piston abutment is shifted between said first and second positions with snap action when said detent means releases said latching force so as to rapidly establish at said outlet either the fluid pressure signal effective at said first inlet or the fluid pressure signal effective at said second inlet.

3. Apparatus, as recited in claim 1, further characterized in that said latching force establishes said second predetermined speed threshold.

4. Apparatus, as recited in claim 1, further characterized in that:
    a. said piston abutment includes a rod member movable therewith for operating said valve means, and
    b. said detent means comprises:
        i. first and second recess means formed along the surface of said rod member in spaced axial relationship with each other,
        ii. first latch means engageable with said first recess means in said first position of said piston abutment, and
        iii. second latch means engageable with said second recess means in said second position of said piston abutment.

5. Apparatus, as recited in claim 1, wherein said detent means comprises means for adjusting said latching force to provide for selective variation of said second predetermined speed threshold.

6. Apparatus, as recited in claim 4, further characterized in that:
    a. said latch means each comprise:
        i. a roller supported by a guide member operably disposed in a chamber of said valve device for movement in a direction transverse to the axis of said rod member,
        ii. spring means disposed in said chamber to act against said guide member and urge said roller in the direction of said rod member, and
        iii. means for adjusting the tension of said spring means in accordance with said second predetermined speed threshold, and
    b. said recess means each comprise a groove conforming substantially to the shape of said rollers for reception of a respective one thereof when said groove is aligned therewith to latch said piston abutment in said first and said second positions, accordingly.

7. Apparatus, as recited in claim 6, wherein said rollers are disposed along the surface of said rod member in diametrically opposed relationship.

8. Apparatus, as recited in claim 1, further comprising:
    a. said piston abutment being subject opposingly to said speed control signal for urging said piston abutment toward said second position and a bias signal for urging said piston abutment toward said first position, and
    b. second pressure regulating means for providing said bias signal for acting in conjunction with said latching force to establish the speed signal to which said piston abutment is responsive in switching between said first and second positions.

9. Apparatus, as recited in claim 8, further characterized in that said bias signal is limited by said second regulating means to a value greater than the value to which said first regulating means limits the signal effective at said first inlet.

* * * * *